United States Patent
Hashimoto et al.

(10) Patent No.: US 6,808,784 B2
(45) Date of Patent: Oct. 26, 2004

(54) GLASS SUBSTRATE FOR MAGNETIC RECORDING MEDIA AND MANUFACTURING METHOD THEREOF

(75) Inventors: Junichi Hashimoto, Penang (MY); Kensuke Matsuno, Yokkaichi (JP); Takeo Watanabe, Sagamihara (JP)

(73) Assignee: Hoya Corporation, Tokyo (JP)

( * ) Notice: Subject to any disclaimer, the term of this patent is extended or adjusted under 35 U.S.C. 154(b) by 14 days.

(21) Appl. No.: 10/143,372

(22) Filed: May 10, 2002

(65) Prior Publication Data

US 2002/0197437 A1 Dec. 26, 2002

(30) Foreign Application Priority Data

May 14, 2001 (JP) ........................................ 2001-143534

(51) Int. Cl.[7] ................................................. G11B 5/82
(52) U.S. Cl. ................ 428/65.3; 428/66.7; 428/694 ST
(58) Field of Search .............................. 428/65.3, 66.7, 428/694 ST

(56) References Cited

U.S. PATENT DOCUMENTS 6,096,405 A * 8/2000 Takahashi et al. .......... 428/141
6,521,862 B1 * 2/2003 Brannon ................ 219/121.66
2002/0108400 A1   8/2002 Watanabe et al.
2002/0121110 A1   9/2002 Saito et al.
2003/0003763 A1   1/2003 Kurachi et al.
2003/0109202 A1   6/2003 Matsuno et al.
2003/0110803 A1   6/2003 Saito et al.

FOREIGN PATENT DOCUMENTS

JP           11-265506      * 9/1999

* cited by examiner

Primary Examiner—Stevan A. Resan
(74) Attorney, Agent, or Firm—Frishauf, Holtz, Goodman & Chick, P.C.

(57) ABSTRACT

There is provided a glass substrate for magnetic recording media, which enables damage to a magnetic recording medium using the glass substrate to be prevented. The glass substrate is a donut-shaped glass substrate comprising major surfaces, an outer peripheral edge surface, an inner peripheral edge surface, and chamfered surfaces, each connecting between one of the major surfaces and one of the outer peripheral edge surface and the inner peripheral edge surface. Each of the chamfered surfaces comprises a conical surface part and an annular curved surface part connected to one another, and for each of the chamfered surfaces, a percentage ratio of a length of an outline of the annular curved surface part to a length of an outline of the chamfered surface in a cross section of the glass substrate including a central axis of the glass substrate is not less than a predetermined value.

26 Claims, 5 Drawing Sheets

GLASS SUBSTRATE FOR MAGNETIC RECORDING MEDIA AND MANUFACTURING METHOD THEREOF

BACKGROUND OF THE INVENTION

1. Field of the Invention

The present invention relates to a glass substrate for magnetic recording media and a manufacturing method thereof.

2. Description of the Related Art

Aluminum substrates have hitherto been widely used as substrates for magnetic recording media such as magnetic disks. However, as notebook/mobile personal computers have gained in popularity, there have been increased demands for magnetic disks to be made thinner, for the recording density of the recording surfaces of magnetic disks to be increased, and for magnetic disks to be made more durable to changes in usage environment. To cope with these demands, in recent years glass substrates have become widely used, since glass substrates have high shock resistance, rigidity and hardness, and high chemical durability to changes in usage environment, and also a high degree of flatness, enabling the flying height of a magnetic head to be made low, which is indispensable for increasing the recording density of the recording surfaces.

In general, in mechanical processing such as grinding to adjust the dimensions (diameters) of the inner and outer peripheral edge surfaces of a donut-shaped glass substrate to predetermined dimensions, or chamfering to form chamfered surfaces of predetermined shapes, the predetermined dimensions or shapes are realized by grinding down the glass using abrasive grains attached to grindstones.

The mechanism by which the abrasive grains grind down the glass is as follows. The abrasive grains attached to the rotating grindstones collide with the surfaces of the glass substrate, thus producing cracks in the surfaces of the glass substrate due to the impact force. The cracks then grow, whereupon a small amount of glass breaks away from the surfaces of the glass substrate.

However, if the breakaway of the small amount of glass is incomplete, then minute cracks will remain in the surfaces of the glass substrate. The glass substrate may subsequently be subjected to mechanical or thermal shock, for example thermal shock generated when films are formed on the surfaces of the glass substrate during manufacture of a magnetic disk, mechanical shock generated when the magnetic disk using the glass substrate is incorporated into a hard disk drive, or mechanical or thermal shock generated due to changes in usage environment of a notebook/mobile personal computer into which the magnetic disk has been incorporated. The minute cracks will not grow much if stress due to such mechanical or thermal shock is dispersed over the whole of the glass substrate, but will grow at quite a high rate if stress due to such mechanical or thermal shock is concentrated in one place on the glass substrate and this place coincides with a place where minute cracks remain. In such a case, the minute cracks will grow into larger cracks, and these larger cracks may cause the magnetic disk using the glass substrate to break.

Examples of causes of minute cracks remaining include the shape of the diamond abrasive grains attached to the grindstones being poor, the grain size of these abrasive grains being too large, or the grinding rate being too high.

Moreover, stress due to mechanical or thermal shock tends to be concentrated at boundary parts between the inner and outer peripheral edge surfaces and the chamfered surfaces. These boundary parts are processed by the grindstones from each side thereof, and hence minute cracks are prone to remain, which may grow into larger cracks as described above.

Furthermore, at boundary parts between the major surfaces and the chamfered surfaces, if the angle between the chamfered surface and the major surface is 135° or less, then so-called chipping in which glass breaks away from the major surface side during mechanical grinding will be prone to occur.

SUMMARY OF THE INVENTION

It is an object of the present invention to provide a glass substrate for magnetic recording media and a manufacturing method thereof, which enable damage to a magnetic recording medium using the glass substrate to be prevented.

To attain the above object, in a first aspect of the present invention, there is provided a donut-shaped glass substrate for magnetic recording media, comprising major surfaces, an outer peripheral edge surface, an inner peripheral edge surface, and chamfered surfaces, each connecting between one of the major surfaces and one of the outer peripheral edge surface and the inner peripheral edge surface, wherein each of the chamfered surfaces comprises a conical surface part and an annular curved surface part connected to one another, and for each of the chamfered surfaces, a percentage ratio of a length of an outline of the annular curved surface part to a length of an outline of the chamfered surface in a cross section of the glass substrate including a central axis of the glass substrate is not less than a predetermined value.

In the first aspect of the present invention, it is preferable that the predetermined value is 20%.

More preferably, the predetermined value is 50%.

In the first aspect of the present invention, it is also preferable that for each of the chamfered surfaces, a radius of curvature of the outline of the annular curved surface part is in a range of 0.10 to 0.50 mm.

More preferably, the radius of curvature is in a range of 0.20 to 0.35 mm.

To attain the above object, in a second aspect of the present invention, there is provided a donut-shaped glass substrate for magnetic recording media, comprising major surfaces, an outer peripheral edge surface, an inner peripheral edge surface, and chamfered surfaces, each connecting between one of the major surfaces and one of the outer peripheral edge surface and the inner peripheral edge surface, wherein for each of the chamfered surfaces, an angle between the chamfered surface and one of the major surfaces connected to the chamfered surface is an obtuse angle.

In the second aspect of the present invention, it is preferable that the angle is in a range of 136 to 165°.

More preferably, the angle is in a range of 140 to 155°.

To attain the above object, in a third aspect of the present invention, there is provided a method of manufacturing a donut-shaped glass substrate for magnetic recording media, comprising a disk processing step of forming major surfaces, an outer peripheral edge surface and an inner peripheral edge surface, and a chamfering step of chamfering angular parts, each between one of the major surfaces and one of the outer peripheral edge surface and the inner peripheral edge surface, thus forming a glass substrate for magnetic recording media according to the first or second aspect of the present invention.

Preferably, the method of manufacturing a glass substrate for magnetic recording media further comprises, after the chamfering step, a major surface polishing step of polishing the major surfaces with a polishing amount of not less than 5 µm, and an edge surface polishing step of polishing the outer peripheral edge surface and the inner peripheral edge surface with a polishing amount of not less than 5 µm.

More preferably, a mother glass of the glass substrate is a silicate glass containing at least one compound selected from the group consisting of $Li_2O$ and $Na_2O$ as an alkali oxide component, and the method further comprises, after the major surface polishing step, a chemical strengthening step of replacing alkali metal ions of the alkali oxide component in a surface layer of each of the major surfaces with alkali metal ions having a larger ionic radius than the alkali metal ions of the alkali oxide component.

According to the first aspect of the present invention, for each of the chamfered surfaces, the percentage ratio of the length of the outline of the annular curved surface part to the length of the outline of the chamfered surface in a cross section of the glass substrate including the central axis of the glass substrate is not less than a predetermined value, preferably 20%. As a result, stress arising in boundary parts, each between one of the chamfered surfaces and one of the inner and outer peripheral edge surfaces, due to mechanical or thermal shock can be dispersed, and hence damage to a magnetic recording medium using the glass substrate can be prevented.

Moreover, according to the first aspect, the above predetermined value is more preferably 50%. As a result, the above effects can be exhibited yet more reliably.

Moreover, according to the first aspect, for each of the chamfered surfaces, the radius of curvature of the outline of the annular curved surface part is preferably in a range of 0.10 to 0.50 mm. As a result, by increasing the lower limit of the radius of curvature of a grindstone used to process the annular curved surface part, abrasive grains can be attached uniformly onto the surface of the grindstone, and hence the strength of attachment of the abrasive grains can be raised, and thus the lifetime of the grindstone can be lengthened. Moreover, by reducing the upper limit of the radius of curvature of the grindstone, the boundary part between the conical surface part and the annular curved surface part can be prevented from becoming discontinuous, and hence stress arising in the boundary part between the conical surface part and the annular curved surface part can be dispersed, and thus damage to a magnetic recording medium using the glass substrate can be prevented yet more reliably.

According to the second aspect of the present invention, for each of the chamfered surfaces, the angle between the chamfered surface and the major surface connected to this chamfered surface is an obtuse angle, preferably in a range of 136 to 165°. As a result, shaking of the glass substrate during processing of the chamfered surfaces using the grindstones can be prevented, and hence narrowing of the width of the chamfered surfaces can be inhibited, and thus stress arising in the chamfered surfaces can be dispersed. Moreover, the occurrence of un-ground parts can be prevented, and hence minute cracks can be removed from the chamfered surfaces. Furthermore, chipping at boundary parts, each between one of the chamfered surfaces and one of the major surfaces, can be prevented, and hence the amount of polishing required to remove chips can be reduced, and thus the manufacturing cost can be reduced.

According to the third aspect of the present invention, chamfering is carried out on angular parts, each between one of the major surfaces and one of the inner and outer peripheral edge surfaces, thus forming a glass substrate for magnetic recording media according to the first or second aspect of the present invention. As a result, stress arising in boundary parts, each between one of the chamfered surfaces and one of the inner and outer peripheral edge surfaces, due to mechanical or thermal shock can be dispersed, and hence damage to a magnetic recording medium using the glass substrate can be prevented.

Moreover, according to the third aspect, preferably, after the chamfering of the glass substrate, the major surfaces of the glass substrate are polished with a polishing amount of not less than 5 µm, and the inner and outer peripheral edge surfaces of the glass substrate are polished with a polishing amount of not less than 5 µm. As a result, minute cracks can be removed reliably, and hence damage to a magnetic recording medium using the glass substrate can be prevented reliably.

Moreover, according to the third aspect, the mother glass of the glass substrate is preferably a silicate glass containing at least one compound selected from the group consisting of $Li_2O$ and $Na_2O$ as an alkali oxide component, and alkali metal ions of the alkali oxide component in a surface layer of each of the major surfaces of the glass substrate are replaced with alkali metal ions having a larger ionic radius than the alkali metal ions of the alkali oxide component. As a result, the strength of the glass substrate can be increased.

The above and other objects, features and advantages of the invention will become more apparent from the following detailed description taken in conjunction with the accompanying drawings.

DETAILED DESCRIPTION OF THE PREFERRED EMBODIMENTS

Figure 1:
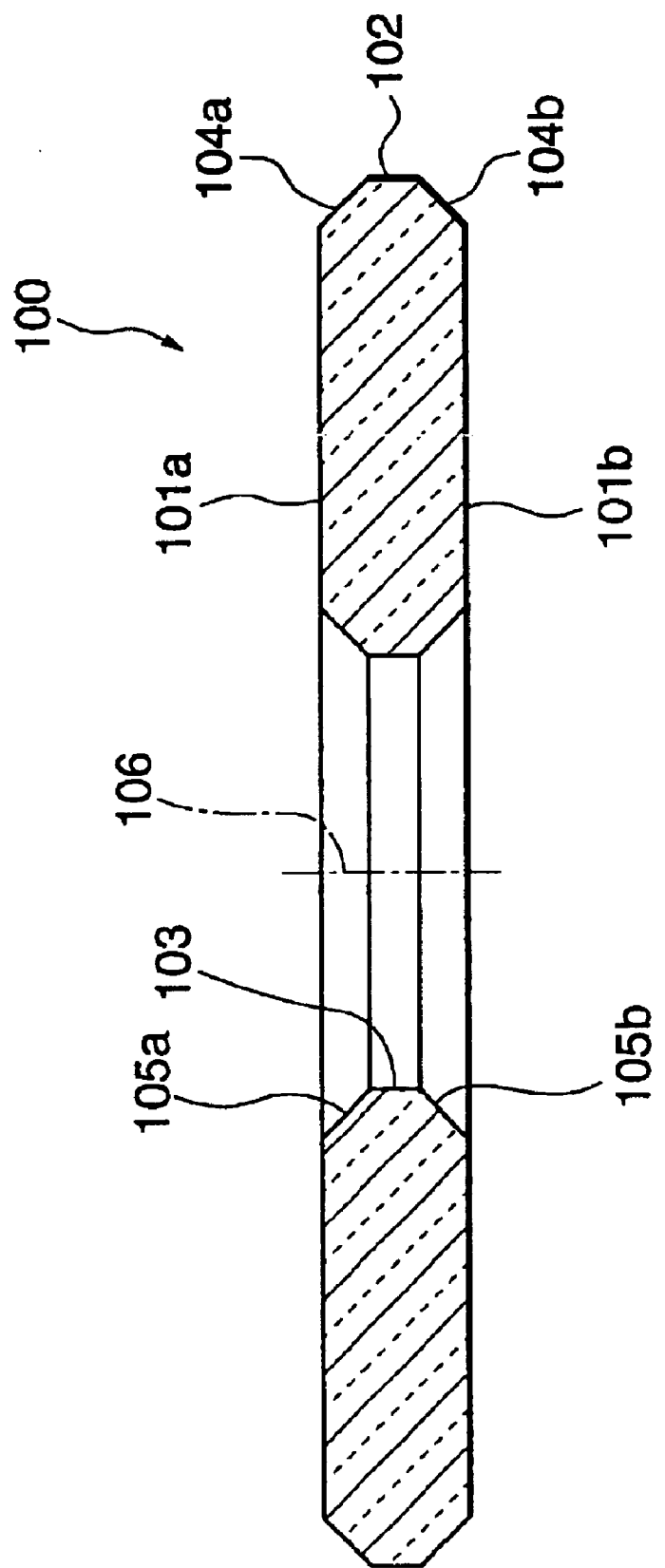
FIG. 1 is a cross-sectional view of a glass substrate for magnetic recording media according to an embodiment of the present invention.

The present inventors carried out assiduous studies to attain the above object, and as a result discovered that, in a donut-shaped glass substrate for magnetic recording media having major surfaces, an outer peripheral edge surface, an inner peripheral edge surface, and chamfered surfaces, each connecting between one of the major surfaces and one of the inner and outer peripheral edge surfaces, if each of the chamfered surfaces is comprised of a conical surface part and an annular curved surface part connected to one another, wherein for each of the chamfered surfaces, the percentage ratio of the length of the outline of the annular curved surface part to the length of the outline of the chamfered surface in a cross section of the glass substrate including the central axis of the glass substrate is not less than 20%, preferably not less than 50%, then stress arising in boundary parts, each between one of the chamfered surfaces and one of the inner and outer peripheral edge surfaces, due to mechanical or thermal shock can be dispersed, and hence damage to a magnetic recording medium using the glass substrate can be prevented.

Moreover, the present inventors discovered that, in a donut-shaped glass substrate for magnetic recording media having major surfaces, an outer peripheral edge surface, an inner peripheral edge surface, and chamfered surfaces, each connecting between one of the major surfaces and one of the inner and outer peripheral edge surfaces, if the angle between each of the chamfered surfaces and the major surface connected to this chamfered surface is in a range of 136 to 165°, preferably 140 to 155°, then shaking of the glass substrate for magnetic recording media during processing of the chamfered surfaces using grindstones can be prevented, and hence narrowing of the width of the chamfered surfaces can be inhibited, and thus stress arising in the chamfered surfaces can be dispersed. Moreover, the occurrence of un-ground parts can be prevented, and hence minute cracks can be removed from the chamfered surfaces. Furthermore, chipping at boundary parts, each between one of the chamfered surfaces and one of the major surfaces, can be prevented, and hence the amount of polishing required to remove chips can be reduced, and thus the manufacturing cost can be reduced.

Furthermore, the present inventors discovered that in a method of manufacturing a donut-shaped glass substrate for magnetic recording media having major surfaces, an outer peripheral edge surface and an inner peripheral edge surface, if the method includes a chamfering step of chamfering angular parts, each between one of the major surfaces and one of the inner and outer peripheral edge surfaces, thus forming a glass substrate for magnetic recording media according to the present invention, then stress arising in boundary parts, each between one of the chamfered surfaces and one of the inner and outer peripheral edge surfaces, due to mechanical or thermal shock can be dispersed, and hence damage to a magnetic recording medium using the glass substrate can be prevented.

A detailed description will now be given of the glass substrate for magnetic recording media according to an embodiment of the present invention, with reference to the drawings.

FIG. 1 is a cross-sectional view of the glass substrate for magnetic recording media according to the present embodiment.

In FIG. 1, the donut-shaped glass substrate for magnetic recording media 100 has two major surfaces 101a and 101b, an outer peripheral edge surface 102, an inner peripheral edge surface 103, a chamfered surface 104a that connects the major surface 101a and the outer peripheral edge surface 102, a chamfered surface 104b that connects the major surface 101b and the outer peripheral edge surface 102, a chamfered surface 105a that connects the major surface 101a and the inner peripheral edge surface 103, and a chamfered surface 105b that connects the major surface 101b and the inner peripheral edge surface 103.

Figure 2:
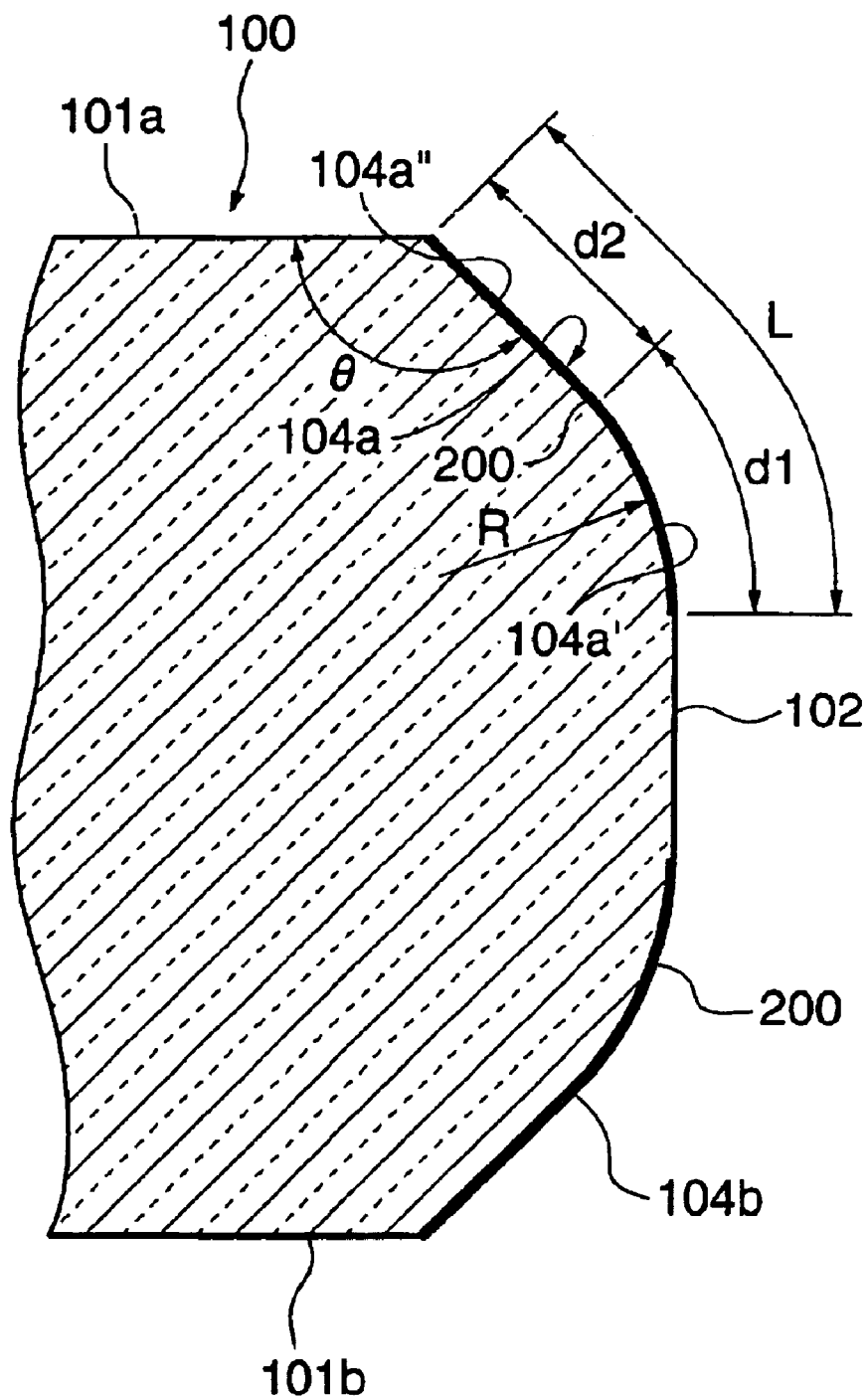
FIG. 2 is an enlarged cross-sectional view of part of the glass substrate for magnetic recording media appearing in FIG. 1.

FIG. 2 is an enlarged cross-sectional view of part of the glass substrate 100 appearing in FIG. 1.

As shown in FIG. 2, the chamfered surface 104a is comprised of an annular curved surface part 104a' and a conical surface part 104a'' that are connected to one another.

The ratio (d1/L) of the length d1 of an outline of the annular curved surface part 104a' to the length L of an outline 200 of the chamfered surface 104a in a cross section of the glass substrate 100 including a central axis 106 of the glass substrate 100 as a percentage is not less than 20%, preferably not less than 50%. As a result, stress arising in a boundary part between the outer peripheral edge surface 102 and the chamfered surface 104a due to mechanical or thermal shock can be dispersed, and hence damage to a magnetic recording medium using the glass substrate can be prevented.

Moreover, the radius of curvature R of the outline of the annular curved surface part 104a' is in a range of 0.10 to 0.50 mm, preferably 0.20 to 0.35 mm. As a result, by increasing the lower limit of the radius of curvature of a grindstone used to process the annular curved surface part 104a', abrasive grains can be attached uniformly onto the surface of the grindstone, and hence the strength of attachment of the abrasive grains can be raised, and thus the lifetime of the grindstone can be lengthened. Moreover, by reducing the upper limit of the radius of curvature of the grindstone, the boundary part between the conical surface part 104a'' and the annular curved surface part 104a' can be prevented from becoming discontinuous, and hence stress arising in the boundary part between the conical surface part 104a'' and the annular curved surface part 104a' can be dispersed, and thus damage to a magnetic recording medium using the glass substrate can be prevented yet more reliably.

Moreover, the angle θ between the major surface 101a and the chamfered surface 104a is in a range of 136 to 165°, preferably 140 to 155°. As a result, shaking of the glass substrate 100 during processing of the chamfered surface 104a using the grindstone can be prevented, and hence narrowing of the width of the chamfered surface 104a can be inhibited, and thus stress arising in the chamfered surface 104a can be dispersed. Moreover, the occurrence of un-ground parts can be prevented, and hence minute cracks can be removed from the chamfered surface 104a, and thus damage to a magnetic recording medium using the glass substrate can be prevented. Furthermore, chipping at the boundary part between the major surface 101a and the chamfered surface 104a can be prevented, and hence the amount of polishing required to remove chips can be reduced, and thus the manufacturing cost can be reduced.

If the angle θ is less than 136°, then chipping will become prone to occur at the boundary part between the major surface 101a and the chamfered surface 104a. On the other hand, if the angle θ is greater than 165°, then shaking of the glass substrate 100 will occur due to misalignment between the grindstone and the glass substrate 100, and overall the length L of the outer periphery intersection line (outline) 200 and the inner periphery intersection line will increase, and hence when removing minute cracks by polishing the chamfered surface 104a, it will not be possible to polish all of the chamfered surface 104a, resulting in minute cracks being prone to remain in unpolished parts.

The above also applies to the chamfered surfaces 104b, 105a and 105b.

Moreover, the mother glass from which the glass substrate 100 is made is a silicate glass that is rigid and durable to chemicals such as alkalis, a crystallized glass made by crystallizing a silicate glass through heat treatment, or the like.

Examples of a silicate glass include soda lime silicate glass which is used as window glass in building, aluminosilicate glass, borosilicate glass, and easily-chemically-strengthened glass. Easily-chemically-strengthened glass is chemically strengthened by bringing the glass into contact with molten potassium nitrate to replace lithium ions and/or sodium ions in the glass with potassium ions, which have a larger ionic radius than lithium ions and sodium ions, or by bringing the glass into contact with molten sodium nitrate to replace lithium ions in the glass with sodium ions, which have a larger ionic radius than lithium ions, thus generating compressive stress in a surface layer (depth about 50 to 200 μm) of the glass. An example of this type of glass contains as principal components 60 to 65 mass % of $SiO_2$, 10 to 20 mass % of $Al_2O_3$, 0 to 5 mass % of MgO, 0 to 5 mass % of CaO, 2 to 10 mass % of $Li_2O$, and 5 to 15 mass % of $Na_2O$.

Moreover, a crystallized glass has principal components selected from $SiO_2$, $Al_2O_3$, $Li_2O$, MgO, $P_2O_3$, ZrO, $CeO_2$, $TiO_2$, $Na_2O$ and $K_2O$.

There are no particular limitations on the composition of the crystallized glass, but an example contains 70 to 80 mass % of $SiO_2$, 2 to 8 mass % of $Al_2O_3$, 1 to 7 mass % of $K_2O$, 5 to 15 mass % of $Li_2O$ and 1 to 5 mass % of $P_2O_5$.

The glass substrate 100 can be prepared from a starting material glass plate formed using a float glass manufacturing method, a down-draw manufacturing method or a redraw manufacturing method, by forming the starting material glass plate into a donut shape using grindstones, or from molten glass, by forming a donut shape directly by direct pressing using upper and lower molds. In the case that the donut shape is formed using grindstones, the inner and outer perimeters of the starting material glass plate may be cut simultaneously, or alternatively the outer perimeter of the starting material glass plate may first be formed into a circle using a grindstone, and then the central part of the starting material glass plate may be bored out afterwards using a cylindrical grindstone.

A description will now be given of a method of manufacturing the glass substrate for magnetic recording media according to an embodiment of the present invention, with reference to the drawings.

Figure 3:
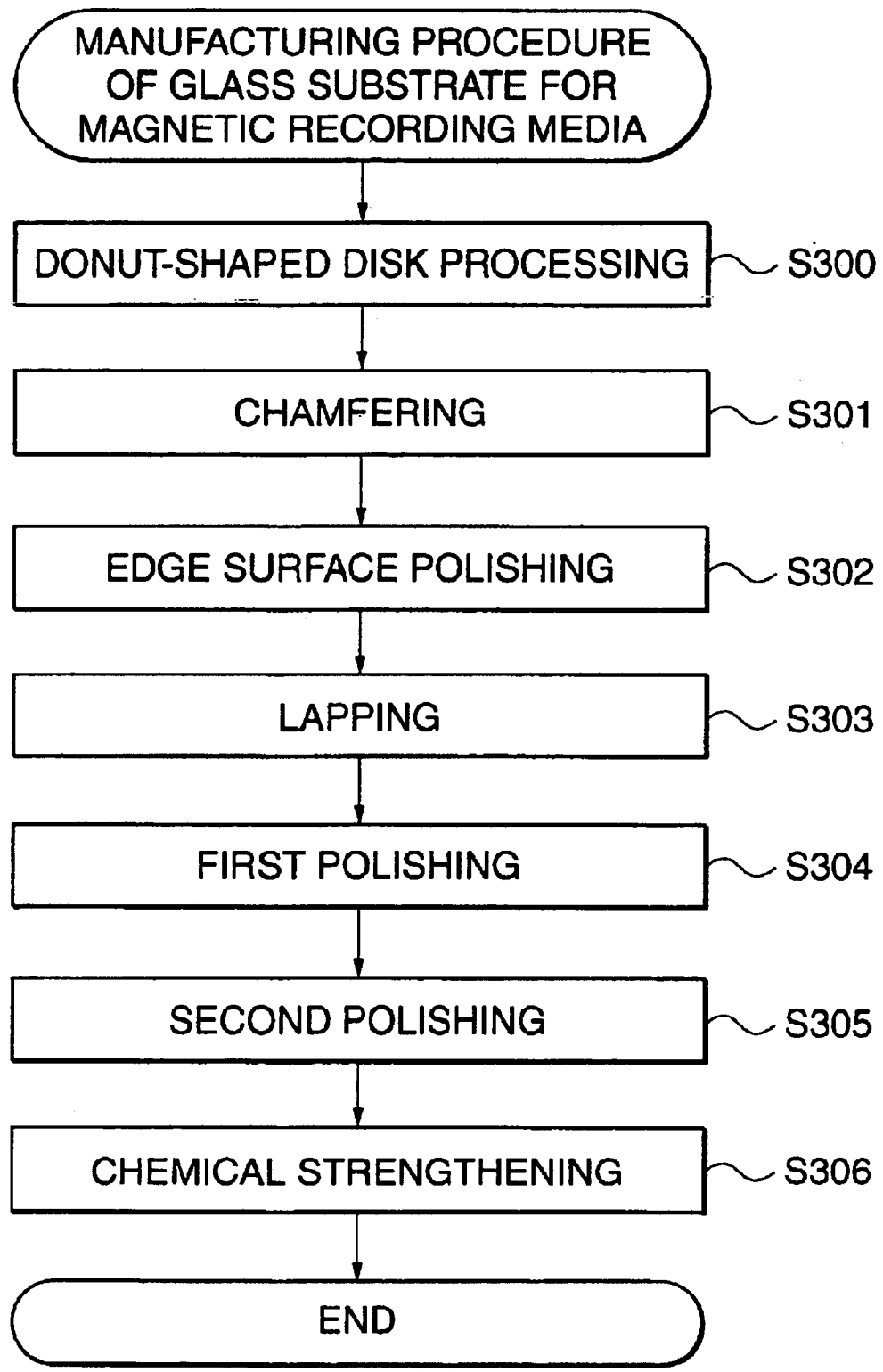
FIG. 3 is a flowchart of a manufacturing procedure of a glass substrate for magnetic recording media according to an embodiment of the present invention.

FIG. 3 is a flowchart of the manufacturing procedure of the glass substrate for magnetic recording media according to the present embodiment.

The present procedure is for manufacturing the glass substrate for magnetic recording media according to the embodiment of the present invention described above.

In FIG. 3, first a starting material glass plate, which has been formed in the form of a plate by floating the starting material glass on molten metal using the float glass manufacturing method, having an aluminosilicate glass composition is prepared. The inner and outer peripheries of the starting material glass plate are then cut simultaneously using hard metal cutters, thus forming a donut-shaped glass substrate 100 having an outside diameter of 96 mm, an inside diameter of 24 mm and a thickness of 1.15 mm (step S300).

Figure 4:
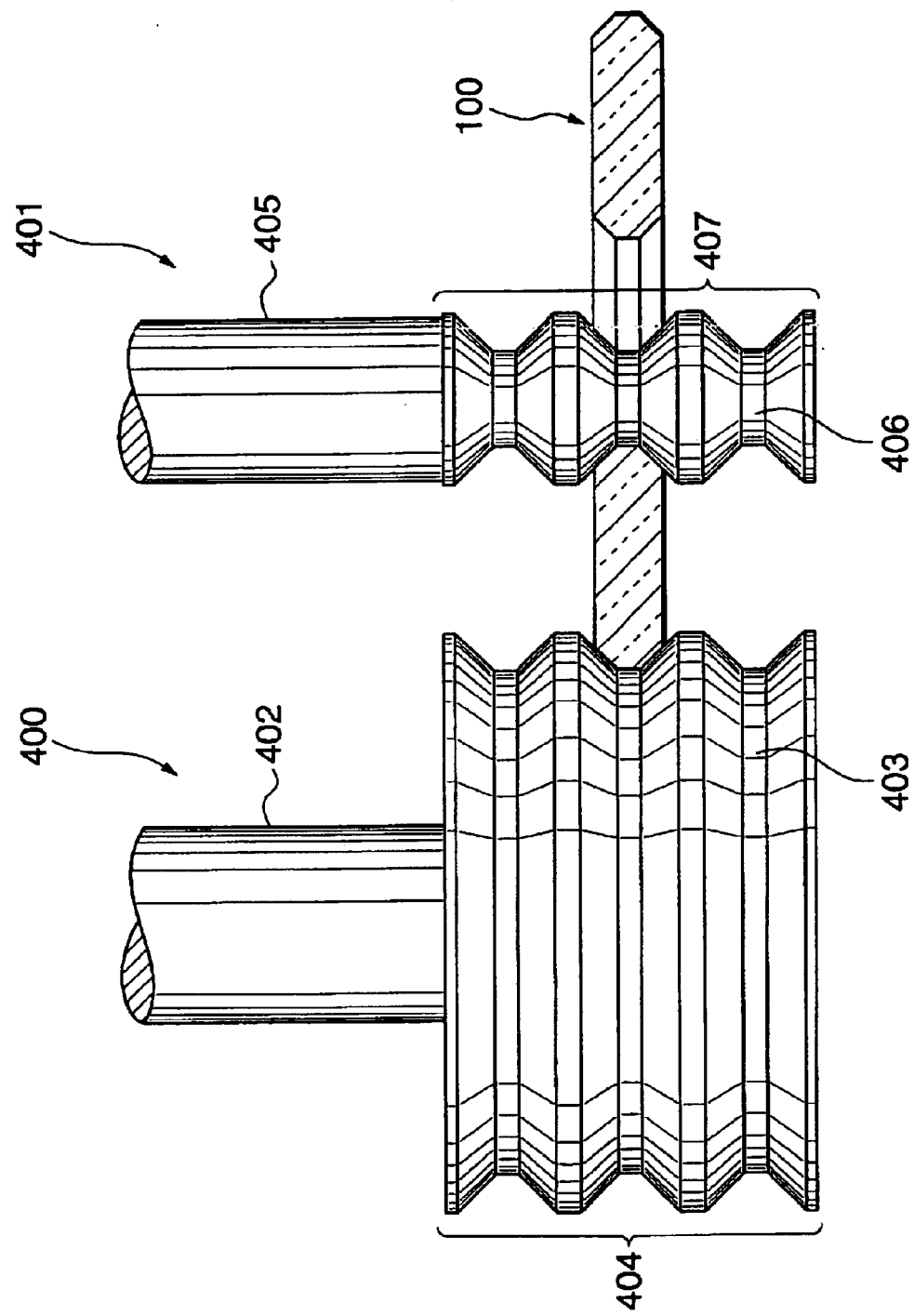
FIG. 4 is a view showing grindstones used in a chamfering step appearing in FIG. 3.

Next, by grinding using grindstones as shown in FIG. 4 described below, the diameter of the outer peripheral edge surface 102 of the glass substrate 100 is adjusted to 95 mm, and the diameter of the inner peripheral edge surface 103 is adjusted to 25 mm, and at the same time the chamfered surface 104a connecting the major surface 101a and the outer peripheral edge surface 102, the chamfered surface 104b connecting the major surface 101b and the outer peripheral edge surface 102, the chamfered surface 105a connecting the major surface 101a and the inner peripheral edge surface 103, and the chamfered surface 105b connecting the major surface 101b and the inner peripheral edge surface 103 are formed. At this time, the radius of curvature R of the annular curved surface parts 104a', 104b', 105a' and 105b' that exist at the places of intersection of the chamfered surfaces 104a, 104b, 105a and 105b respectively with either the outer peripheral edge surface 102 or the inner peripheral edge surface 103 is adjusted to 0.2 mm, and the angle θ is adjusted to 155° (step S301).

FIG. 4 is a view showing the grindstones used in the chamfering step appearing in FIG. 3.

In FIG. 4, the grindstones are comprised of an outer peripheral edge surface grinding grindstone 400 that adjusts the diameter of the outer peripheral edge surface 102, and an inner peripheral edge surface grinding grindstone 401 that adjusts the diameter of the inner peripheral edge surface 103.

The outer peripheral edge surface grinding grindstone 400 is comprised of a rotating shaft 402 and a grindstone group 404. The grindstone group 404 is comprised of a predetermined number of annular grindstones 403 stacked on top of one another. Each grindstone 403 has in an outer peripheral part thereof a processing groove having a shape complementary to the desired shape of the outer peripheral edge surface 102 and the chamfered surfaces 104a and 104b. The outer peripheral edge surface grinding grindstone 400 is rotated about the rotating shaft 402, and by contacting the outer peripheral edge surface 102 via the processing groove, adjusts the diameter of the outer peripheral edge surface 102 of the glass substrate 100, and forms the chamfered surfaces 104a and 104b into predetermined shapes.

Similarly, the inner peripheral edge surface grinding grindstone 401 is comprised of a rotating shaft 405 and a grindstone group 407. The grindstone group 407 is comprised of a predetermined number of grindstones 406 stacked on top of one another. Each grindstone 406 has in an outer peripheral part thereof a processing groove having a shape complementary to the desired shape of the inner peripheral edge surface 103 and the chamfered surfaces 105a and 105b. The inner peripheral edge surface grinding grindstone 401 is rotated about the rotating shaft 405, and by contacting the inner peripheral edge surface 103 via the processing groove, adjusts the diameter of the inner peripheral edge surface 103 of the glass substrate 100, and forms the chamfered surfaces 105a and 105b into predetermined shapes. Diamond abrasive grains are attached to the surface of the processing groove of each of the grindstones 403 and 406.

Returning to FIG. 3, a plurality of the glass substrates 100 are stacked on top of one another such that the major surface 101a of one each glass substrate 100 contacts the major surface 101b of the next glass substrate 100. The stack of glass substrates 100 is rotated, a slurry prepared by dissolving a polishing agent in water is applied onto the stack of glass substrates 100, and the outer peripheral edge surface 102, the inner peripheral edge surface 103 and the chamfered surfaces 104a, 104b, 105a and 105b of each of the glass substrates 100 are polished using polishing brushes with a polishing amount of not less than 5 μm (step S302).

Next, in step S303, the major surfaces 101a and 101b of each glass substrate 100 are lapped using a polishing material of grain size #1000. Polishing material remaining on the major surfaces 101a and 101b of the glass substrate 100 after the lapping may cause the major surfaces 101a and 101b to be scratched or the like in the subsequent first polishing step (major surface polishing step; step S304, described below), and hence once the lapping has been completed, all of the surfaces of the glass substrate 100 are washed with an acidic or alkaline aqueous solution.

Next, in the first polishing step (step S304), scratches on the major surfaces 101a and 101b that arose during the lapping in step S303 are removed using a fine grain polishing agent such as a suspension of cerium oxide. Then, in a second polishing step (major surface polishing step; step S305), precision polishing is carried out, thus adjusting the thickness of the glass substrate 100 to 1.0 mm and smoothing the major surfaces 101a and 101b. The total thickness polished away in steps S304 and S305 is not less than 5 μm. After step S305, the major surfaces 101a and 101b are washed with an acidic or alkaline aqueous solution.

After the major surfaces 101a and 101b have been washed, in step S306 the glass substrate 100 is further strengthened by chemical strengthening treatment to ensure that the strength will be sufficient when a magnetic recording medium such as a magnetic disk manufactured from the glass substrate 100 is rotated at high speed, and then the glass substrate 100 is washed with warm water, alkaline washing water or pure water, thus completing the manufacturing process.

In the chemical strengthening treatment, alkali metal ions in a surface layer of the glass substrate 100 are replaced with alkali metal ions having a larger ionic radius. Specifically, the glass substrate 100 is immersed in a molten salt of potassium nitrate ($KNO_3$) and sodium nitrate ($NaNO_3$) at 400 to 450° C. for 2 to 5 hours, thus replacing sodium ions in the surface layer of the glass substrate 100 with potassium ions, and lithium ions with sodium ions, whereby the strength of the glass substrate 100 is increased.

According to the procedure shown in FIG. 3, stress arising at boundary parts, each between one of the outer peripheral edge surface 102 and the inner peripheral edge surface 103 and one of the chamfered surfaces 104a, 104b, 105a and 105b, due to mechanical or thermal shock can be dispersed, and hence damage to a magnetic recording medium using the glass substrate 100 can be prevented.

EXAMPLES

Specific examples of the present invention will now be described.

First, the procedure shown in FIG. 3 was carried out up to step S302, thus preparing test pieces, i.e. glass substrates for magnetic recording media, of the 10 types shown in Table 1 (Examples 1 to 9, Comparative Example 1).

the Weibull constant was calculated from the measured breaking stress.

Figure 5:
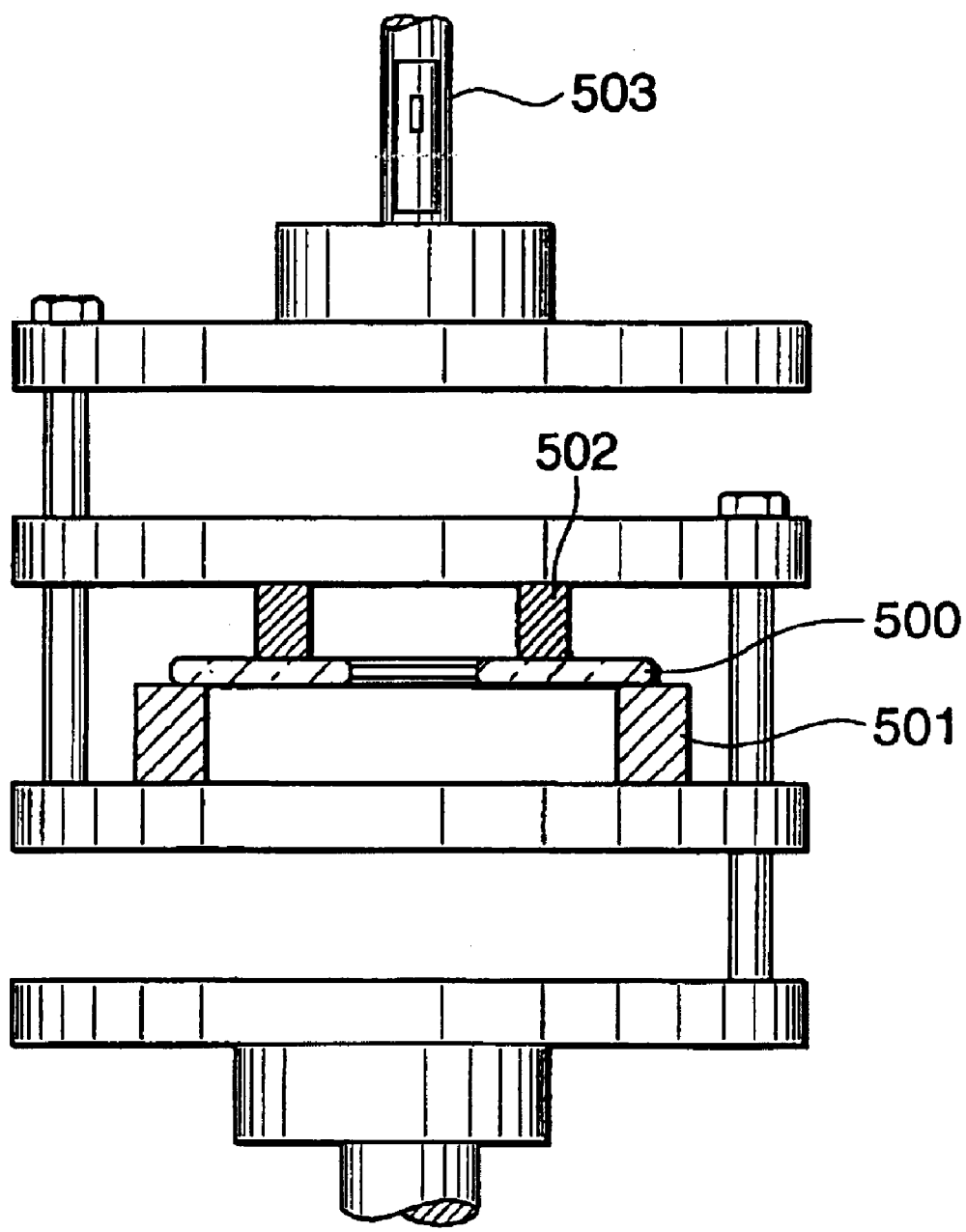
FIG. 5 is a side view schematically showing the constitution of a strength tester used with examples of the present invention.

FIG. 5 is a side view schematically showing the constitution of the strength tester used.

In each strength test, a test piece 500 was set on a steel stage 501, and then a steel ring 502 was set on the test piece 500, as shown in FIG. 5. Pressure was then applied to the test piece 500 via the stage 501 and the ring 502 such that the rate of relative displacement between the stage 501 and the ring 502 was 0.5 mm per minute, and the load when the test piece 500 broke was detected using a load cell 503.

The measurement of the breaking load was carried out 100 times for each of the types of test piece 500, the measured breaking load data was converted into breaking stress data, and the Weibull constant was calculated from the 100 pieces of breaking stress data.

Moreover, a film for a magnetic disk giving a surface recording density of 7 gigabits per square inch was formed onto 10,000 of each of the types of test piece 500, and the number out of the 10,000 test pieces 500 that were damaged was calculated as the failure rate during film formation.

Furthermore, the rate of occurrence of chipping at the boundary parts, each between one of the major surfaces 101a and 101b and one of the chamfered surfaces 104a, 104b, 105a and 105b, was calculated as the chipping defect rate.

The Weibull constant, the failure rate during film formation and the chipping defect rate are shown in Table 1 above.

As can be seen from Table 1, for Comparative Example 1, the percentage ratio of the length d1 of the outline of the annular curved surface part 104a' to the length L of the outline 200 (in Table 1 and hereinafter referred to as the "length ratio of the annular curved surface part") was too low at 17%, and hence stress was prone to be concentrated at the boundary parts between the outer peripheral edge surface 102 and the chamfered surfaces 104a and 104b and the boundary parts between the inner peripheral edge surface 103 and the chamfered surfaces 105a and 105b. As a result, the Weibull constant, a low value of which indicates a low strength reliability, was 15.2, and the failure rate during film formation was 5/10000, i.e. the Weibull constant and the

TABLE 1

| | Length Ratio of Annular Curved Surface Part (%) | Radius of Curvature of Annular Curved Surface Part (nm) | Angle of Intersection θ (°) | Failure Rate During Film Formation | Weibull Constant | Chipping Defect Rate (%) |
|---|---|---|---|---|---|---|
| Example | | | | | | |
| 1 | 63 | 0.20 | 140 | 1/10000 | 22.7 | 0.8 |
| 2 | 90 | 0.35 | 140 | 1/10000 | 22.1 | 0.8 |
| 3 | 30 | 0.05 | 155 | 1/10000 | 20.8 | 0.5 |
| 4 | 53 | 0.10 | 155 | 2/10000 | 20.0 | 0.5 |
| 5 | 56 | 0.20 | 136 | 1/10000 | 22.0 | 1.0 |
| 6 | 99 | 0.20 | 165 | 2/10000 | 20.0 | 0.3 |
| 7 | 63 | 0.20 | 140 | 1/10000 | 21.8 | 0.8 |
| 8 | 86 | 0.20 | 155 | 1/10000 | 21.0 | 0.5 |
| 9 | 30 | 0.05 | 155 | 2/10000 | 20.0 | 0.5 |
| Comparative Example 1 | 17 | 0.05 | 135 | 5/10000 | 15.2 | 3.0 |

Next, for each of the 10 types of test piece, the breaking stress was measured using a strength tester made by Shimadzu Corporation (trade name: Autograph) (FIG. 5), and failure rate during film formation showed values indicating unsatisfactory strength reliability. For Example 9, on the other hand, the length ratio of the annular curved surface part 104a' was sufficiently high at 30%, and hence stress was not prone to be concentrated at the boundary parts between the outer peripheral edge surface 102 and the chamfered surfaces 104a and 104b and the boundary parts between the inner peripheral edge surface 103 and the chamfered surfaces 105a and 105b. As a result, the Weibull constant and the failure rate during film formation showed values of 20.0 and 2/10000 respectively, indicating satisfactory strength reliability. Furthermore, for Example 5, the length ratio of the annular curved surface part 104a' was yet higher at 56%, and hence stress was yet less prone to be concentrated at the boundary parts between the outer peripheral edge surface 102 and the chamfered surfaces 104a and 104b and the boundary parts between the inner peripheral edge surface 103 and the chamfered surfaces 105a and 105b. As a result, the Weibull constant and the failure rate during film formation showed values of 22.0 and 1/10000 respectively, indicating yet more satisfactory strength reliability. It was thus verified that if the length ratio of the annular curved surface part 104a' is not less than 20%, preferably not less than 50%, then damage to a magnetic disk using the glass substrate can be prevented reliably.

Moreover, as can also be seen from Table 1 above, for Comparative Example 1, the radius of curvature R of the annular curved surface part 104a' was too low at 0.05 mm, and hence stress was prone to be concentrated in the annular curved surface part 104a'. As a result, the Weibull constant and the failure rate during film formation showed values of 15.2 and 5/10000 respectively, indicating unsatisfactory strength reliability. For Example 4, on the other hand, the radius of curvature R of the annular curved surface part 104a' was sufficiently high at 0.10 mm, and hence stress was not prone to be concentrated in the annular curved surface part 104a'. As a result, the Weibull constant and the failure rate during film formation showed values of 20.0 and 2/10000 respectively, indicating satisfactory strength reliability. Furthermore, for Example 7, the radius of curvature R of the annular curved surface part 104a' was yet higher at 0.20 mm, and hence stress was yet less prone to be concentrated in the annular curved surface part 104a'. As a result, the Weibull constant and the failure rate during film formation showed values of 21.8 and 1/10000 respectively, indicating yet more satisfactory strength reliability. It was thus verified that if the radius of curvature R of the annular curved surface part 104a' is not less than 0.10 mm, preferably not less than 0.20 mm, then damage to a magnetic disk using the glass substrate can be prevented reliably.

Furthermore, as can also be seen from Table 1 above, for Example 2, the radius of curvature R of the annular curved surface part 104a' was 0.35 mm, which is sufficiently low, and hence stress generated in the boundary part between the conical surface part 104a" and the annular curved surface part 104a' can be dispersed. As a result, the Weibull constant and the failure rate during film formation showed values of 21.5 and 1/1000 respectively, indicating satisfactory strength reliability. It was thus verified that if the radius of curvature R of the annular curved surface part 104a' is not more than 0.50 mm, preferably not more than 0.35 mm, then damage to a magnetic disk using the glass substrate can be prevented reliably.

Moreover, as can also be seen from Table 1 above, for Example 6, the angle θ was 165°, which is sufficiently low, and hence parts where the width of the chamfered surfaces becomes narrow due to shaking of the glass substrate 100 (hereinafter referred to as "narrowed parts") were not prone to occur. As a result, the Weibull constant and the failure rate during film formation showed values of 20.0 and 2/1000 respectively, indicating satisfactory strength reliability. Furthermore, for Example 3, the angle θ was yet lower at 155°, and hence narrowed parts were yet less prone to occur. As a result, the Weibull constant and the failure rate during film formation showed values of 20.8 and 1/1000 respectively, indicating satisfactory strength reliability. It was thus verified that if the angle θ is not more than 165°, preferably not more than 155°, then damage to a magnetic disk using the glass substrate can be prevented reliably.

Moreover, as can also be seen from Table 1 above, for Comparative Example 1, the angle θ was too low at 135°, and hence the chipping defect rate showed a high value of 3.0%. For Example 5, on the other hand, the angle θ was 136°, and hence the chipping defect rate showed a value of 1.0%. Furthermore, for Example 7, the angle θ was 140°, and hence the chipping defect rate showed a value of 0.8%. It was thus verified that if the angle θ is not less than 136°, preferably not less than 140°, then the amount of polishing required to remove chips can be reduced, and hence the manufacturing cost can be reduced.

As described in detail above, according to the embodiment described above, for each of the chamfered surfaces, the percentage ratio of the length of the outline of the annular curved surface part to the length of the outline of the chamfered surface in a cross section of the glass substrate including the central axis of the glass substrate is not less than 20%. As a result, stress arising in boundary parts, each between one of the chamfered surfaces and one of the inner and outer peripheral edge surfaces, due to mechanical or thermal shock can be dispersed, and hence damage to a magnetic recording medium using the glass substrate can be prevented.

Moreover, according to the embodiment described above, for each of the chamfered surfaces, the percentage ratio of the length of the outline of the annular curved surface part to the length of the outline of the chamfered surface in a cross section of the glass substrate including the central axis of the glass substrate is preferably not less than 50%. As a result, the above effects can be exhibited yet more reliably.

Moreover, according to the embodiment described above, for each of the chamfered surfaces, the radius of curvature of the outline of the annular curved surface part is in a range of 0.10 to 0.50 mm. As a result, by increasing the lower limit of the radius of curvature of a grindstone used to process the annular curved surface part, abrasive grains can be attached uniformly onto the surface of the grindstone, and hence the strength of attachment of the abrasive grains can be raised, and thus the lifetime of the grindstone can be lengthened. Moreover, by reducing the upper limit of the radius of curvature of the grindstone, the boundary part between the conical surface part and the annular curved surface part can be prevented from becoming discontinuous, and hence stress arising in the boundary part between the conical surface part and the annular curved surface part can be dispersed, and thus damage to a magnetic recording medium using the glass substrate can be prevented yet more reliably.

Moreover, according to the embodiment described above, for each of the chamfered surfaces, the angle between the chamfered surface and the major surface connected to this chamfered surface is in a range of 136 to 165°. As a result, shaking of the glass substrate during processing of the chamfered surfaces using the grindstones can be prevented, and hence narrowing of the width of the chamfered surfaces can be inhibited, and thus stress arising in the chamfered surfaces can be dispersed. Moreover, the occurrence of un-ground parts can be prevented, and hence minute cracks can be removed from the chamfered surfaces. Furthermore, chipping at boundary parts, each between one of the chamfered surfaces and one of the major surfaces, can be prevented, and hence the amount of polishing required to remove chips can be reduced, and thus the manufacturing cost can be reduced.

Moreover, according to the embodiment described above, for each of the chamfered surfaces, the angle between the chamfered surface and the major surface connected to this chamfered surface is preferably in a range of 140 to 155°. As a result, the above effects can be exhibited yet more reliably.

Moreover, according to the embodiment described above, in a method of manufacturing the substrate for information recording media, chamfering is carried out on angular parts, each between one of the major surfaces and one of the inner and outer peripheral edge surfaces, thus forming a glass substrate for magnetic recording media according to the present invention. As a result, stress arising in boundary parts, each between one of the chamfered surfaces and one of the inner and outer peripheral edge surfaces, due to mechanical or thermal shock can be dispersed, and hence damage to a magnetic recording medium using the glass substrate can be prevented.

Moreover, according to the embodiment described above, after the chamfering of the glass substrate, the major surfaces of the glass substrate are polished with a polishing amount of not less than 5 μm, and the inner and outer peripheral edge surfaces of the glass substrate are polished with a polishing amount of not less than 5 μm. As a result, minute cracks can be removed reliably, and hence damage to a magnetic recording medium using the glass substrate can be prevented reliably.

Moreover, according to the embodiment described above, the mother glass of the glass substrate is preferably a silicate glass containing at least one compound selected from the group consisting of $Li_2O$ and $Na_2O$ as an alkali oxide component, and alkali metal ions of the alkali oxide component in a surface layer of each of the major surfaces of the glass substrate are replaced with alkali metal ions having a larger ionic radius than the alkali metal ions of the alkali oxide component. As a result, the strength of the glass substrate can be increased.

What is claimed is:

1. A donut-shaped glass substrate for magnetic recording media, comprising:
    major surfaces;
    an outer peripheral edge surface;
    an inner peripheral edge surface; and
    chamfered surfaces, each connecting between one of said major surfaces and one of said outer peripheral edge surface and said inner peripheral edge surface;
    wherein each of said chamfered surfaces comprises a conical surface part and an annular curved surface part connected to one another, and for each of said chamfered surfaces, a percentage ratio of a length of an outline of said annular curved surface part to a length of an outline of said chamfered surface in a cross section of the glass substrate including a central axis of the glass substrate is not less than 20%.

2. A glass substrate for magnetic recording media as claimed in claim 1, wherein the percentage ratio is 50%.

3. A method of manufacturing a donut-shaped glass substrate for magnetic recording media, comprising:
    a disk processing step of forming major surfaces, an outer peripheral edge surface and an inner peripheral edge surface; and
    a chamfering step of chamfering angular parts, each between one of the major surfaces and one of the outer peripheral edge surface and the inner peripheral edge surface, thus forming a glass substrate for magnetic recording media as claimed in claim 2.

4. A method of manufacturing a glass substrate for magnetic recording media as claimed in claim 3, further comprising, after said chamfering step, a major surface polishing step of polishing the major surfaces with a polishing amount of not less then 5 μm, and an edge surface polishing step of polishing the outer peripheral edge surface and the inner peripheral edge surface with a polishing amount of not less than 5 μm.

5. A method of manufacturing a glass substrate for magnetic recording media as claimed in claim 4, wherein a mother glass of the glass substrate is a silicate glass containing at least one compound selected from the group consisting of $Li_2O$ and $Na_2O$ as an alkali oxide component, and the method further comprises, after said major surface polishing step, a chemical strengthening step of replacing alkali metal ions of the alkali oxide component in a surface layer of each of the major surfaces with alkali metal ions having a larger ionic radius than the alkali metal ions of the alkali oxide component.

6. A glass substrate for magnetic recording media as claimed in claim 1, wherein for each of said chamfered surfaces, a radius of curvature of the outline of said annular curved surface part is in a range of 0.10 to 0.50 mm.

7. A method of manufacturing a donut-shaped glass substrate for magnetic recording media, comprising:
    a disk processing step of forming major surfaces, an outer peripheral edge surface and an inner peripheral edge surface; and
    a chamfering step of chamfering angular parts, each between one of the major surfaces and one of the outer peripheral edge surface and the inner peripheral edge surface, thus forming a glass substrate for magnetic recording media as claimed in claim 6.

8. A method of manufacturing a glass substrate for magnetic recording media as claimed in claim 7, further comprising, after said chamfering step, a major surface polishing step of polishing the major surfaces with a polishing amount of not less then 5 μm, and an edge surface polishing step of polishing the outer peripheral edge surface and the inner peripheral edge surface with a polishing amount of not less than 5 μm.

9. A method of manufacturing a glass substrate for magnetic recording media as claimed in claim 8, wherein a mother glass of the glass substrate is a silicate glass containing at least one compound selected from the group consisting of $Li_2O$ and $Na_2O$ as an alkali oxide component, and the method further comprises, after said major surface polishing step, a chemical strengthening step of replacing alkali metal ions of the alkali oxide component in a surface layer of each of the major surfaces with alkali metal ions having a larger ionic radius than the alkali metal ions of the alkali oxide component.

10. A glass substrate for magnetic recording media as claimed in claim 6, wherein the radius of curvature is in a range of 0.20 to 0.35 mm.

11. A method of manufacturing a donut-shaped glass substrate for magnetic recording media, comprising:
    a disk processing step of forming major surfaces, an outer peripheral edge surface and an inner peripheral edge surface; and
    a chamfering step of chamfering angular parts, each between one of the major surfaces and one of the outer peripheral edge surface and the inner peripheral edge surface, thus forming a glass substrate for magnetic recording media as claimed in claim 10.

12. A method of manufacturing a glass substrate for magnetic recording media as claimed in claim 11, further comprising, after said chamfering step, a major surface polishing step of polishing the major surfaces with a polishing amount of not less then 5 µm, and an edge surface polishing step of polishing the outer peripheral edge surface and the inner peripheral edge surface with a polishing amount of not less than 5 µm.

13. A method of manufacturing a glass substrate for magnetic recording media as claimed in claim 12, wherein a mother glass of the glass substrate is a silicate glass containing at least one compound selected from the group consisting of $Li_2O$ and $Na_2O$ as an alkali oxide component, and the method further comprises, after said major surface polishing step, a chemical strengthening step of replacing alkali metal ions of the alkali oxide component in a surface layer of each of the major surfaces with alkali metal ions having a larger ionic radius than the alkali metal ions of the alkali oxide component.

14. A method of manufacturing a donut-shaped glass substrate for magnetic recording media, comprising:
 a disk processing step of forming major surfaces, an outer peripheral edge surface and an inner peripheral edge surface; and
 a chamfering step of chamfering angular parts, each between one of the major surfaces and one of the outer peripheral edge surface and the inner peripheral edge surface, thus forming a glass substrate for magnetic recording media as claimed in claim 1.

15. A method of manufacturing a glass substrate for magnetic recording media as claimed in claim 14, further comprising, after said chamfering step, a major surface polishing step of polishing the major surfaces with a polishing amount of not less than 5 µm, and an edge surface polishing step of polishing the outer peripheral edge surface and the inner peripheral edge surface with a polishing amount of not less than 5 µm.

16. A method of manufacturing a glass substrate for magnetic recording media as claimed in claim 15, wherein a mother glass of the glass substrate is a silicate glass containing at least one compound selected from the group consisting of $Li_2O$ and $Na_2O$ as an alkali oxide component, and the method further comprises, after said major surface polishing step, a chemical strengthening step of replacing alkali metal ions of the alkali oxide component in a surface layer of each of the major surfaces with alkali metal ions having a larger ionic radius than the alkali metal ions of the alkali oxide component.

17. A glass substrate for magnetic recording media as claimed in claim 1, wherein the glass substrate comprises 60 to 65 mass % of $SiO_2$, 10 to 20 mass % of $Al_2O_3$, 0 to 5 mass % of MgO, 0 to 5 mass % of CaO, 2 to 10 mass % of $Li_2O$ and 5 to 15 mass % of $Na_2O$.

18. A glass substrate for magnetic recording media as claimed in claim 1, wherein the glass substrate comprises 70 to 80 mass % of $SiO_2$, 2 to 8 mass % of $Al_2O_3$, 1 to 7 mass % of $K_2O$, 5 to 15 mass % of $LiO_2$ and 1 to 5 mass % of $P_2O_5$.

19. A donut-shaped glass substrate for magnetic recording media comprising:
 major surfaces;
 an outer peripheral edge surface;
 an inner peripheral edge surface; and
 chamfered surfaces, each connecting between one of said major surfaces and one of said outer peripheral edge surface and said inner peripheral edge surface;
 wherein for each of said chamfered surfaces, an angle between said chamfered surface and one of said major surfaces connected to said chamfered surface is in a range of 136 to 165°.

20. A method of manufacturing a donut-shaped glass substrate for magnetic recording media, comprising:
 a disk processing step of forming major surfaces, an outer peripheral edge surface and an inner peripheral edge surface; and
 a chamfering step of chamfering angular parts, each between one of the major surfaces and one of the outer peripheral edge surface and the inner peripheral edge surface, thus forming a glass substrate for magnetic recording media as claimed in claim 19.

21. A method of manufacturing a glass substrate for magnetic recording media as claimed in claim 20, further comprising, after said chamfering step, a major surface polishing step of polishing the major surfaces with a polishing amount of not less then 5 µm, and an edge surface polishing step of polishing the outer peripheral edge surface and the inner peripheral edge surface with a polishing amount of not less than 5 µm.

22. A method of manufacturing a glass substrate for magnetic recording media as claimed in claim 21, wherein a mother glass of the glass substrate is a silicate glass containing at least one compound selected from the group consisting of $Li_2O$ and $Na_2O$ as an alkali oxide component, and the method further comprises, after said major surface polishing step, a chemical strengthening step of replacing alkali metal ions of the alkali oxide component in a surface layer of each of the major surfaces with alkali metal ions having a larger ionic radius than the alkali metal ions of the alkali oxide component.

23. A glass substrate for magnetic recording media as claimed in claim 19, wherein the angle is in a range of 140 to 155°.

24. A method of manufacturing a donut-shaped glass substrate for magnetic recording media, comprising:
 a disk processing step of forming major surfaces, an outer peripheral edge surface and an inner peripheral edge surface; and
 a chamfering step of chamfering angular parts, each between one of the major surfaces and one of the outer peripheral edge surface and the inner peripheral edge surface, thus forming a glass substrate for magnetic recording media as claimed in claim 23.

25. A method of manufacturing a glass substrate for magnetic recording media as claimed in claim 24, further comprising, after said chamfering step, a major surface polishing step of polishing the major surfaces with a polishing amount of not less then 5 µm, and an edge surface polishing step of polishing the outer peripheral edge surface and the inner peripheral edge surface with a polishing amount of not less than 5 µm.

26. A method of manufacturing a glass substrate for magnetic recording media as claimed in claim 25, wherein a mother glass of the glass substrate is a silicate glass containing at least one compound selected from the group consisting of $Li_2O$ and $Na_2O$ as an alkali oxide component, and the method further comprises, after said major surface polishing step, a chemical strengthening step of replacing alkali metal ions of the alkali oxide component in a surface layer of each of the major surfaces with alkali metal ions having a larger ionic radius than the alkali metal ions of the alkali oxide component.

* * * * *